Figure 1:
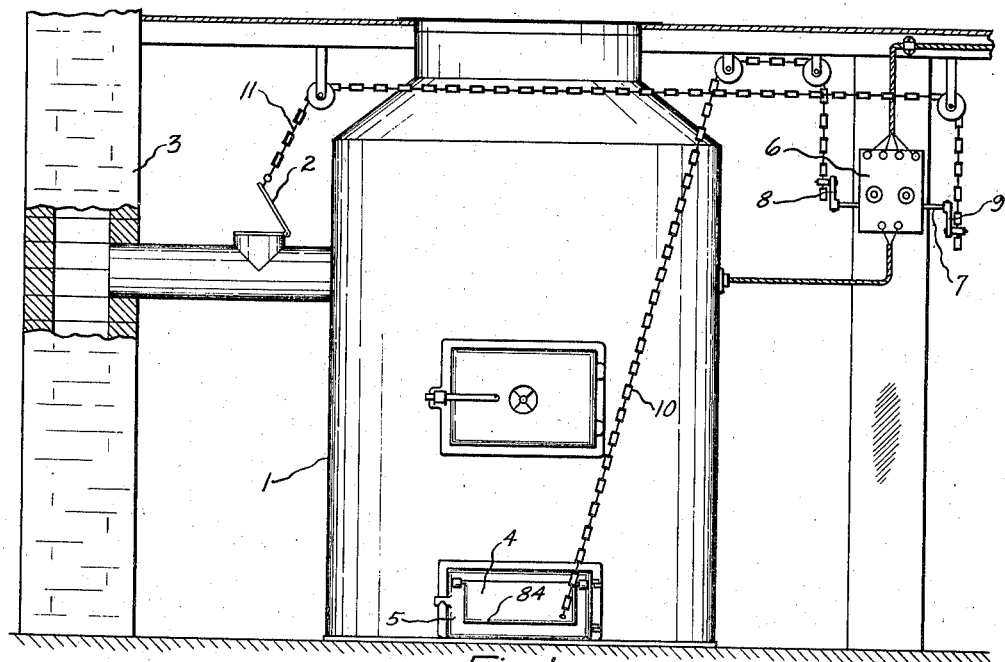

July 2, 1940.  M. R. DOOLITTLE  2,206,298
METHOD AND APPARATUS FOR THE CONTROL OF TEMPERATURE
Filed Feb. 16, 1934  3 Sheets-Sheet 1

Inventor
Mervin R. Doolittle
By Beaman & Langford
Attorney

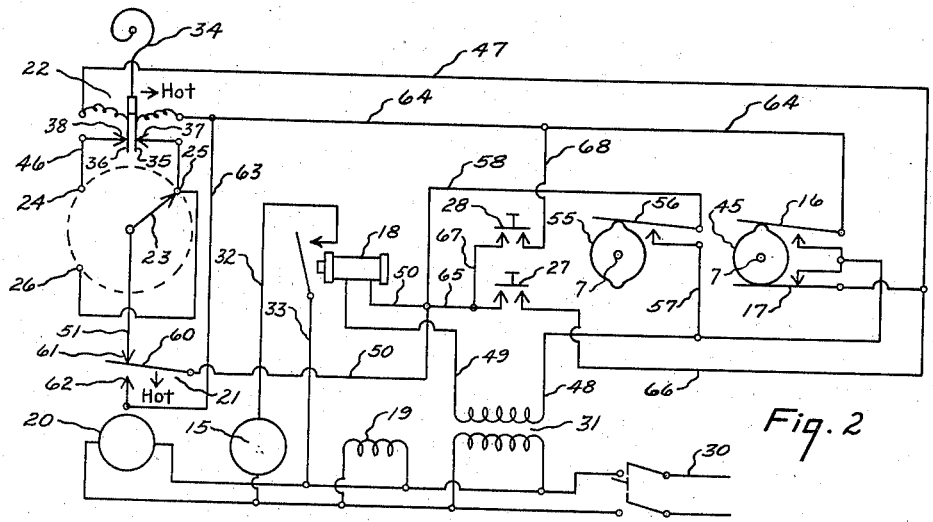
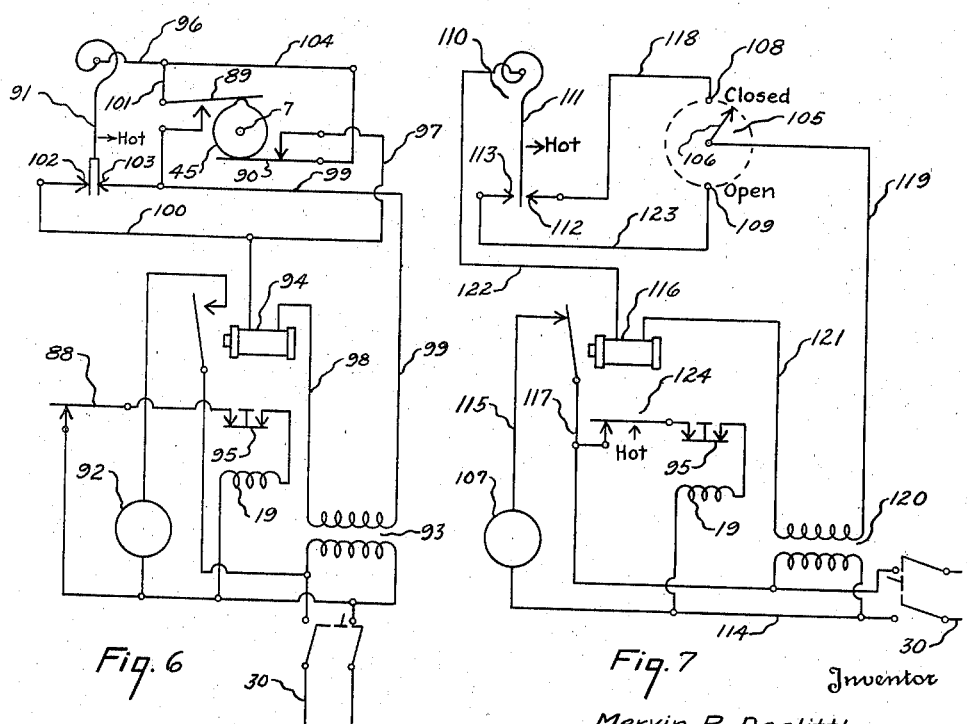

July 2, 1940.　　　　M. R. DOOLITTLE　　　　2,206,298
METHOD AND APPARATUS FOR THE CONTROL OF TEMPERATURE
Filed Feb. 16, 1934　　　3 Sheets-Sheet 3
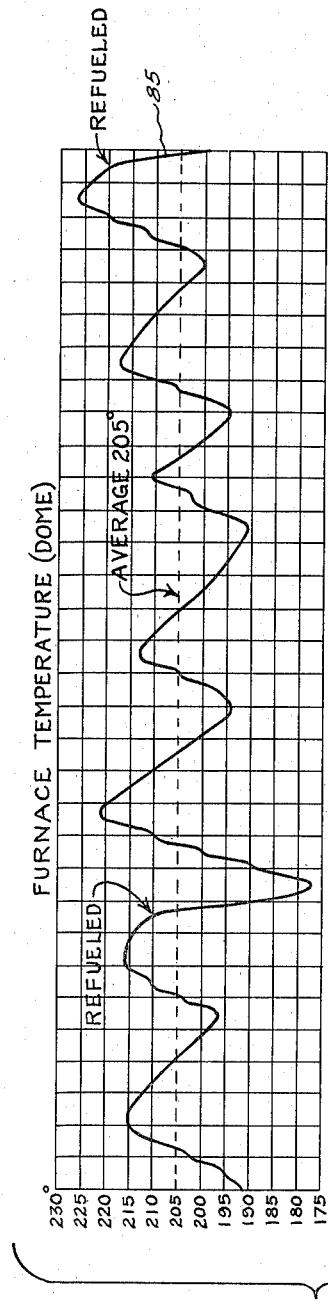
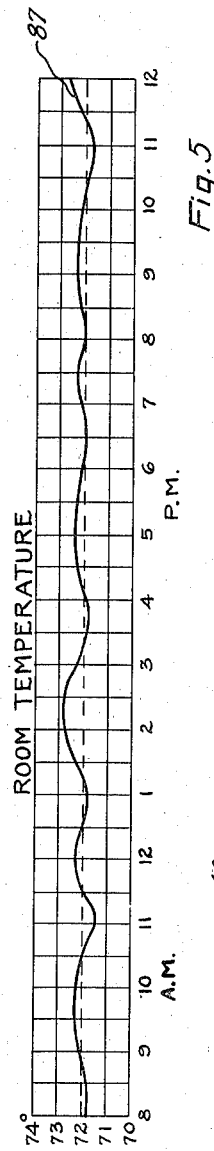
Fig. 5
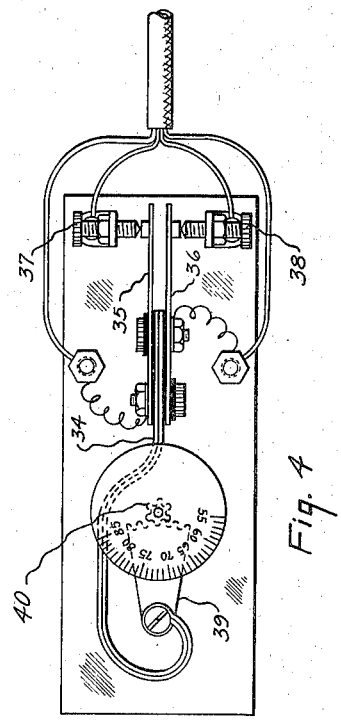
Fig. 4
Inventor
Mervin R. Doolittle
By Beaman & Langford
Attorney Patented July 2, 1940

2,206,298

UNITED STATES PATENT OFFICE 2,206,298

METHOD AND APPARATUS FOR THE CONTROL OF TEMPERATURE

Mervin R. Doolittle, Jackson, Mich.

Application February 16, 1934, Serial No. 711,542

11 Claims. (Cl. 236—74)

This invention relates to a method and apparatus for the automatic control of temperature and more particularly to apparatus responsive to temperature variations at a selected point to control that temperature by anticipating the temperature variations.

In changing the temperature of a mass or space by the transfer of heat from a heat producing means to the mass or space to be heated or conversely, by the transfer of heat to a cold producing means from a mass or space to be refrigerated, if the source of energy to either of these temperature changing means be discontinued, there will be what may be termed a heat momentum in the direction of the change. The extent to which this action maintains varies as the difference between both the masses of and the temperatures of the temperature changing means and the mass or space whose temperature is being changed. For example the temperature in a room heated by a furnace changes much more slowly than the temperature of the furnace and when the combustion in the furnace is stopped or retarded the furnace, being of appreciable mass compared with the air in the room and being at a considerably higher temperature than the room, will continue to deliver heat to the room after the combustion has been stopped or retarded.

In the usual form of thermostatic temperature control, the source of energy to a heat producing means is not stopped until the temperature at the selected point has reached the value beyond which further rise is not desired. Due to the heat momentum mentioned above a further rise is inevitable. Also the source of energy is not restored when the temperature falls to the same value at which it was stopped, nor is it restored until the temperature falls to a somewhat lower value, with the result that even greater heat momentum results than would result if this additional temperature drop had been anticipated by the temperature control apparatus. The same theory applies to the control of a cold producing means such as a refrigerating system, except that the temperature change and the heat momentum are in the opposite direction.

An object of this invention is to provide an apparatus and method for controlling temperature by anticipating both upward and downward temperature changes to prevent or reduce to a minimum the heat momentum in the temperature changing means.

Another object of this invention is to control the temperature of a space or mass by alternately increasing and decreasing the heat or cold producing activity of the temperature changing means in regulated periods.

A further object of this invention is to control temperatures as stated immediately above by interrupting the cycles of alternate operation by holding over at regulated times a selected one of said periods.

Figure 3:
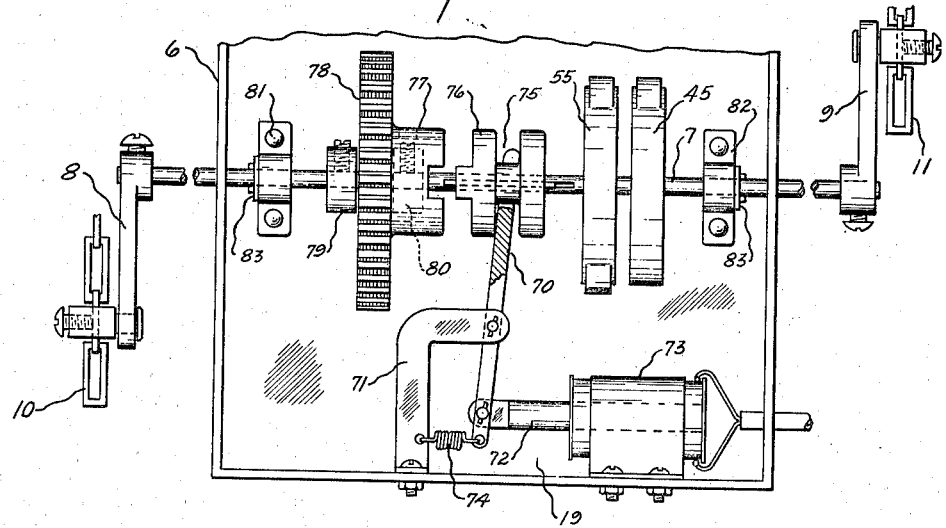

It is within the contemplation of this invention that the method of temperature control herein described be applicable to the control of any kind of heating or refrigerating equipment and that the apparatus for accomplishing the functions of this method may take one of an unlimited number of forms. It may serve to start and stop the combustion as in the case of a burner using liquid or gaseous fuel, or it may serve as in the case of a burner using solid fuel, to retard or accelerate the combustion by actuating the draft and check and/or the fuel feeding device. For purpose of illustration an apparatus which controls the draft and check of a conventional furnace burning solid fuel is described by the following specification and the above and other objects will be apparent when taken with the accompanying drawings in which, Fig. 1 is an elevation showing the temperature controlling apparatus installed on a furnace, Fig. 2 is a wiring diagram of the system, Fig. 3 is a detail of an electromagnetic clutch, Fig. 4 is a plan view of the room thermostat, Fig. 5 is a chart showing the operation of my invention, Fig. 6 is the wiring diagram of a modification, and Fig. 7 is the wiring diagram of another modification.

Referring to Fig. 1 the furnace 1 is provided with the usual check 2 in the flue 3 and draft 4 in the ash pit door 5.

The temperature regulating apparatus is contained in a casing 6 which is located in any convenient position near the furnace 1. The driving shaft 7 extends from the casing 6 and carries on the ends thereof and extending in opposite directions, arms 8 and 9. The draft 4 is connected by the flexible chain 10 to the arm 8 and the flexible chain 11 connects the arm 9 to the check 2. The operation of the draft 4 and check 2 is that for one position of the shaft 7 with its arms 8 and 9, the draft 4 is open and the check 2 is closed and for the diametrically opposite position of the shaft 7 and its arms 8 and 9, the draft 4 is closed and the check 2 is open. The closing movement of both the draft 4 and the check 2 is effected by gravity due to their respective weights.

Fig. 2 discloses the wiring diagram of the apparatus. It includes an electric motor 15 for driving, through suitable reduction gearing the shaft 7, limit switches, 16 and 17, a relay, 18, an electromagnetic clutch or voltage release 19, a contactor motor 20, a room thermostat 22 and a furnace thermostat 21.

The operation of the apparatus is briefly as follows: The contactor motor 20 drives continuously a rotatable contact arm 23. In the path of the contact arm 23 are an opening contact 24, a closing contact 25 and a supplementary closing contact 26. Temperature control is provided directly through the furnace thermostat 21 and the room thermostat 22. Assuming that the furnace temperature is not excessive and the room temperature is normal, the contact arm 23 on engaging the opening contact 24 opens the draft and upon striking the closing contact 25 closes the draft. It is to be understood, that by closing the draft, opening of the check is also included and vice versa. In order to open or close the draft at any desired time such as when firing the furnace the manual buttons 27 and 28, respectively are provided.

More specifically the apparatus and operation are as follows: A source of power 30, such as a house lighting circuit, is connected to a transformer 31 to step down the voltage for the operating circuits. Connected across the source 30 are the contactor motor 20 and the voltage release or electromagnetic clutch 19. The operating motor 15 also is driven from the source 30 but has its own opening and closing circuit comprising the conductors 32 and 33 and the electromagnetic switch or relay 18. Operation of the relay 18 opens and closes the operating motor 15 circuit to control the operation of the motor 15. The relay 18 circuit includes the furnace thermostat 21 and the room thermostat 22. The furnace thermostat 21 is normally in circuit closing position but when the temperature of the furnace rises to a predetermined dangerously high degree it opens to prevent normal operation of the system and closes the supplementary draft closing circuit to close the draft and open the check 2.

The room thermostat 22 is shown in plan view of Fig. 4. A bimetallic element 34 has attached thereto and insulated therefrom two flexible contact strips 35 and 36 which are spaced from and insulated from each other. Adjustable contacts 37 and 38 are located on each side of the flexible contact strips 35 and 36. The bimetallic element 34 is provided with a gear segment 39 and having an engaging pinion 40 for adjusting the flexible strips 35 and 36 with respect to the contacts 37 and 38. An indicating dial 41 is secured to the pinion 40 for rotation therewith. The room thermostat 22 is set so that within a predetermined temperature range of one or two degrees, for instance, the flexible contacts 35 and 36 are in engagement with the contacts 37 and 38, respectively. The adjustment is also such that when the room temperature rises above the maximum of said range the contacts 36 and 38 will separate, preventing the completion of the draft opening circuit. The result is that the draft will remain closed until the contacts 36 and 38 again come into contact with each other due to a fall in temperature and until the contactor moves into opening position. Should the temperature lower to a point below the minimum of said range the contacts 35 and 37 are opened with the result that the draft will not close until the contacts 35 and 37 again come into contact and the contactor moves into draft closing position.

The relay 18 circuit also includes the spring limit switches 16 and 17. One or the other of these switches is normally closed. A rotating cam 45 carried by the shaft 7 of the driving motor 15 alternately opens the limit switches 16 and 17. Opening of a limit switch prevents the opening or closing of the draft depending upon whether the open limit switch is in the opening or closing relay circuit. The shaft 7 carrying the draft 4 and check 2 controlling arms 8 and 9 is also driven by the driving motor 15. The cam 45 is arranged, due to the fact that the arms 8 and 9 and the cam 45 are carried by the shaft 7, so that the relay 18 circuit is opened at the moment the draft 4 is opened and the check 2 is closed or vice versa, depending on the limit switch with which the cam engages.

Fig. 2 shows the circuit for the draft 4 in closed position. For opening the draft the relay 18 circuit comprises the contact arm 23, the contact 24, the conductor 46 connecting the contact 24 with the room thermostat 22, the conductor 47 to the limit switch 17, the conductor 48 to the transformer 31, the conductor 49 from the transformer 31 to the relay 18, the conductor 50 from the relay 18 to the furnace thermostat 21 and the conductor 51 back to the contact arm 23.

The continuously rotating contact arm 23 engages the contacts 24, 25, and 26 for a very short interval of time. In practice the interval may be not more than a few seconds. The shaft 7, however, may take many times that long before it completes half a revolution to complete the opening or closing of the draft 4. In order to hold over the relay 18 circuit until the shaft 7 has completed its half revolution, a holding circuit is provided. This circuit is controlled by the cam 55 fixed to and rotatable with the shaft 7 and operating a holding spring switch 56. The holding circuit comprises the conductor 57 from the holding switch 56, the conductor 48 to the transformer 31, the conductor 49 from the transformer 31 to the relay 18 and the conductors 50 and 58 back to the holding switch 56. The holding circuit is normally open but is closed upon rotation of the shaft 7 to move the draft and which at the same time moves the cam 55 from switch opening position. At the end of the half revolution of the shaft 7 and consequently the cam 55, the holding switch 56 is again cammed open, the relay circuit is opened and the motor 15 stopped.

In the event that the draft is open but the room does not heat sufficiently to close the contacts 35 and 37 until the moving arm 23 just passes the closing contact 25, an auxiliary closing contact 26, connected to contact 25, closes the draft 4 and thus prevents an unduly long open draft period under the circumstances just described.

To prevent over-heating of the furnace, the furnace thermostat 21 is provided. It comprises a bimetallic element 60 and adjustable contacts 61 and 62. The furnace thermostat 21 is adjusted to normally maintain a closed circuit between the conductors 50 and 51. However, should the furnace overheat, the bimetallic element is adjusted to move from engagement with the contact 61 to engagement with the contact 62. The contact 62 is connected by conductor 63 with the conductor 64 to close the draft closing circuit. Thus normal operation of the apparatus is prevented and the draft remains closed until the furnace cools sufficiently to permit the furnace thermostat to break the circuit between conductors 63 and 50 and close that between conductors 50 and 51. This draft closing circuit is made through the limit switch 16, which is closed while the draft is open.

At the time the furnace is being fired it may be desirable to open or close the draft. For this purpose the manual opening and closing circuits including manual buttons 27 and 28, respectively, are provided. As already stated according to Fig. 2 the draft 4 is closed. Should it be desired to open the draft 4, closing of the circuit, including the button 27, by pressing the button 27, will actuate the relay 18 to close the motor 15 circuit to operate the draft 4 and check 2 by moving arms 8 and 9 and the cams 45 and 55. As soon as the cam 55 moves sufficiently to allow the holding switch 56 to close, the holding circuit, above described, comes into operation. The motor 15 will then continue to rotate until the holding switch 56 is again opened thus opening the holding circuit and opening the relay 18 and stopping the motor as above described. This rotation of the motor will open the draft and close the check. When the draft is opened it may be closed by closing the circuit, including the button 28 by pressing the button 28. The opening circuit, including the button 27 comprises the button 27, the conductors 65 and 50 to the relay 18, the conductor 49 from the relay to the transformer 31, the conductor 48 to the limit switch 17 and the conductor 66 back to the button 27. The closing circuit, including the button 28, comprises the button 28, the conductors 67, 65 and 50 to the relay 18, the conductor 49 from the relay 18 to the transformer 31, the conductor 48 to the limit switch 16, and the conductors 64 and 68 back to the button 28.

In order that the draft 4 and the check 2 may not be left in opened and closed positions respectively, during a failure of the source 30, the shaft 7 is connected to the motor 15 through a magnetic clutch 19 as shown more particularly in Fig. 3. The magnetic clutch 19 comprises the yoke 70 pivoted at the middle thereof to a bracket 71 and to the plunger 72 of a solenoid 73. Opposing the action of the solenoid 73, tending to open the clutch is a spring 74 connected to one end of the yoke 70 and to the bracket 71. The yoke 70 engages with the central depressed portion 75 of a toothed, driven, clutch member 76. The clutch member 76 is slidably keyed to the shaft 7. Rotatably mounted on the shaft 7 is also the driving clutch member 77 preferably integrally formed with the gear wheel 78 forming a part of the driving connection between the motor and the shaft 7. The clutch member 77 is maintained in fixed axial position on the shaft 7 by the collars 79 and 80. The shaft 7 is rotatably mounted in the bearings 81 and 82 secured to the rear of the casing 6 and held against axial movement by the pinned washers 83.

During operation of the apparatus the solenoid 73 is energized holding the plunger 72 to the right and moving the clutch members 76 and 77 into operative engagement. Failure of the power supply will result in deenergization of the solenoid 73 and consequent disengagement of the clutch members 76 and 77 due to the action of the spring 74. Upon disengagement of the clutch the draft 4 and check 2 automatically close and open respectively by the action of gravity due to the weighted bottom 84 of the draft 4.

Fig. 5 is a chart showing the operation of the invention. The curve 85 represents the furnace dome temperature. The curve 86 represents the periods of opened and closed drafts corresponding to the other curve and the curve 87 represents the room temperature during the operation of the furnace as controlled according to the curve 86.

Fig. 6 is a wiring diagram of a simplified modification of my invention in which the theory of operation is the same as the apparatus shown in Fig. 2. The principle differences in this modification is that the contactor motor is dispensed with and its function is performed by the operation of the driving motor 92 and limit switch cam 45. The apparatus according to this modification includes a room thermostat 91, a furnace thermostat 88, spring limit switches 89 and 90, and a cam 45 therefor, an operating motor 92 driving the shaft 7 carrying arms 8 and 9, the transformer 93, the relay 94, the magnetic clutch 19, the release button 95 and the power source 30. The room thermostat 91 operates generally in the same manner as the room thermostat 22 to close two switches simultaneously within a predetermined temperature range and to open one or the other of said switches when the temperature rises or falls from said range, the switch opened depending on whether the temperature rises or falls.

Assuming that the room temperature is within the range for which the thermostat 91 is set and assuming further that motor 92 is in operation and that cam 45 which rotates with shaft 7 has passed the position shown in Fig. 6 sufficiently to have closed the spring limit switch 89, there is then a closed relay 94 circuit comprising relay 94, conductor 97 to spring limit switch 90, conductor 104 to spring limit switch 89, conductor 99 to transformer 93 and conductor 98 back to relay 94. The spring limit switch 89 is shunted by thermostat 91 through its contact 103 and the spring limit switch 90 is shunted by thermostat 91 through its contact 102. When the cam 45 rotates to open spring limit switch 90 the relay 94 circuit still remains closed through the thermostat 91 and its contact 102 and the rotation continues. When the cam 45 rotates to open spring limit switch 89 the relay 94 circuit still remains closed through thermostat 91 and its contact 103 and the rotation continues. Thus as long as the room temperature remains within the range for which the thermostat 91 is set, the motor 92 operates continuously to alternately open and close the draft and check respectively.

Should during the rotation through any cycle the room temperature rise above the range for which the thermostat is set, the bimetallic blade would move to the right opening the circuit through it and its contact 102. When the cam 45 rotates to open spring limit switch 90 it is no longer shunted by thermostat 91 through its contact 102 and the relay 94 circuit is thus opened causing the motor 92 circuit to open and the motor to stop with shaft 7 and cam 45 in the draft closed position. When the room temperature falls to the upper end of the range for which the thermostat is set the relay 94 circuit is again closed and the rotation of shaft 7 and cam 45 is resumed. Similarly if the room temperature falls below the range for which the thermostat is set, the bimetallic blade would move to the left and in like manner to that described above, the motor would stop with shaft 7 and cam 45 in the draft open position.

It will thus be seen that for a room temperature within the range for which the room thermostat is set, the operating motor 92 together with its cam 45 will continuously rotate. Upon the room temperature rising or lowering below the range for which the room thermostat is set the operating motor 92 together with the cam 45 will stop rotating until the room temperature reaches the range to which the room thermostat is adjusted.

In order to prevent overheating of the furnace, the furnace is provided with the furnace thermostat 88. The furnace thermostat 88 is included within the magnetic clutch 19 circuit and normally maintains the circuit closed. However, upon excessive heating of the furnace, the thermostat moves to break the magnetic clutch 19 circuit resulting in the opening of the magnetic clutch which in turn results in closing the draft 4 and the opening of the check 2 due to the action of gravity. Should it be desired to change the position of the drafts by manual operation at any time the release button 95 in the magnetic clutch circuit may be depressed to open the circuit releasing the shaft 7 for free operation.

Fig. 7 discloses another modification. This modification differs from those already described in that the room thermostat is of more simple construction comprising a bimetallic element and a contact on either side thereof, and in the elimination of the limit and holding switches. Referring to the drawings, a contactor 105 having a rotating switch arm 106 rotates with the driving motor 107 and is arranged to make contact with the contact 108 at the moment the draft is closed and with contact 109 when the draft is open. It is to be understood that the arm 106 is carried by the shaft 7 and therefore relates in synchronism with the arms 8 and 9 which continuously open and close the draft and check respectively. The room thermostat 110 comprises a bimetallic element 111 and contacts 112 and 113. The contacts 112 and 113 are adjustable so that within a predetermined room temperature range of one or two degrees, for instance, the bimetallic element 111 does not engage with either one. If the room temperature rises to a value above the predetermined range the bimetallic element 111 engages with the contact 112, if the room temperature falls below the predetermined range the bimetallic element 111 engages the contact 113. The operation is such that when the room temperature is above the predetermined range, a circuit is partially completed by the bimetallic element 111 and the contact 112 and is wholly completed when the rotating contact arm 106 engages with the contact 108. It is this circuit which opens the motor 107 circuit to stop the motor while the draft is closed.

The motor 107 is included in a circuit including the conductors 114 and 115, the normally closed contact of relay 116 and the conductor 117, the circuit being connected across the power source 30. The solenoid of relay 116 is included in the room thermostat 110 and contactor 105 circuit above described and, when the said circuit is closed, relay 116 contacts are opened to stop the motor. The circuit which stops the motor in draft closed position comprises the bimetallic element 111, the contact 112 to the contact 108 of the contactor 105, the conductor 119 from the contactor 105 to the transformer 120, the conductor 121 to the relay 116 and the conductor 122 back to the bimetallic element 111. Should the room temperature fall below the predetermined range, the draft opening circuit will be completed through the contactor contact 109 and operate to stop the motor at the moment the draft is fully open. This circuit comprises the bimetallic element 111, the conductor 123 to the contact 109 of the contactor 105, the conductor 119 to the transformer 120, the conductor 121 to the relay 116 and the conductor 122 back to the bimetallic element 111.

To provide against overheating of the furnace, the furnace thermostat 124 is provided in the same circuit with the magnetic clutch or voltage release 19 heretofore described. Included in this circuit is the release button 95 also heretofore described. The utility and operation of these elements have been described with reference to the modification disclosed by Fig. 6, so that the same will not be repeated for this modification.

With reference to the modification disclosed by Fig. 2 it has been found that the most satisfactory operation for a domestic heating furnace is realized under normal conditions by adjusting the rotative speed of the contactor for an open draft for six minutes and a closed draft for fourteen minutes. With this relation room temperature changes are successfully anticipated, and the draft closes or opens in time to prevent excessive or unsufficient heat. Were not the temperature changes anticipated by the regularly acting draft control, and a response not received by the furnace until the room has reached the desired temperature, the heat momentum of the furnace would carry the room temperature past that desired.

In the modification of Figs. 6 and 7 the draft, during normal operation, continuously opens and closes slowly. However, the period of wide open draft, and hence highly effective draft, is less than half the time for one revolution which approximates the above ratio of six to fourteen of open to closed draft. Hence the result is the same as in the modification of Fig. 2 and temperature changes are likewise anticipated.

While the foregoing specification described only three specific modifications it is nevertheless within the contemplation of this invention that other and equivalent modifications be included. The specific expedients used may be replaced by other equivalent mechanical expedients; the relay and the transformer may be dispensed with; the transformer may be dispensed with and the whole circuit may be operated by a high voltage, or the whole circuit, including the operating motor may be operated by a low voltage. It is further within the contemplation of this invention that it be used also to control the feeding of fuel to a furnace and it is, therefore, not desired that this invention be limited except by the scope of the following claims.

I claim:

1. In a heating system with a furnace having a draft, the combination of a draft opening circuit, a draft closing circuit, a thermostat simultaneously maintaining a switch in each circuit closed over a predetermined temperature range, a limit switch in each circuit and means to operate alternately said limit switches to operate said draft, while said predetermined temperature range prevails, said thermostat being operative out of said temperature range to interrupt alternate operation of said draft.

2. In a thermostatically controlled system, the combination of a furnace, means for transferring heat from the furnace to a desired region, means controlling the draft to said furnace, a motor for alternately opening and closing said draft controlling means during the time in which said region is maintained within a relatively small predetermined temperature range, a circuit controlling said motor and means to open said motor circuit when the temperature of said region is above said predetermined range so as to prevent the motor from moving the draft controlling means to a heat stimulating position and to open said motor circuit when the temperature of said region is below said predetermined range so as to prevent the motor from moving the draft controlling means to a heat retarding position.

3. In a temperature regulating system, the combination of a furnace with a draft, means for transferring heat from said furnace to a desired region, a motor to open and close alternately in periods of fixed duration the draft of said furnace, a circuit controlling said motor, a circuit controlling said motor circuit and means within said last named circuit to open the motor circuit when the region temperature moves above a relatively small predetermined range so as to prevent the motor from opening the draft and to open said motor circuit when the temperature of said region is below said predetermined range so as to prevent the motor from closing the draft.

4. In a heating system the combination of primary means for producing combustion, a draft therefor, means transferring heat from said primary means to a desired region, means alternately to open and close said draft in periods of fixed duration while the temperature regulated is within a relatively small predetermined range, means to interrupt said alternate operation when the temperature regulated is either above or below said predetermined range, and manually operable means to interrupt said alternate operation and to permit automatically the resumption of said alternate operation at the end of a fixed period of time provided the temperature of the region being heated remains within a predetermined range.

5. In a heating system combination of primary means for producing combustion, a draft therefor, means transferring heat from said primary means to a desired region, means alternately to open and close said draft in periods of fixed duration while the temperature in said region is within a predetermined range, means to hold said draft open or closed continuously at the conclusion of one of said alternate periods while the temperature in said region is without said range and manually operable means to interrupt said alternate operation and to permit automatically the resumption of said alternate operation while the temperature in said region is within said range, said manually operable means being also effective to open or close said draft and to permit its automatic resumption to normal position while the temperature in said region is without said range.

6. The method of temperature control which comprises the establishment of a predetermined temperature range, alternately in periods of fixed duration exerting a temperature increasing effect and a temperature decreasing effect while the temperature is within said range, and upon completion of the last period of temperature decreasing effect when the temperature rises above said range extending said period indefinitely while the temperature remains above said range, and upon completion of the last period of temperature increasing effect when the temperature falls below said range, extending said period indefinitely while the temperature remains below said range, and when desired manually increasing one of said effects, and at the end of a fixed period of time provided the temperature regulated remains within said range automatically resuming said alternate operation.

7. In a heating system with a furnace having a draft, the combination with a draft opening circuit, of a draft closing circuit, a thermostat simultaneously maintaining a switch in each circuit closed over a predetermined range, and means in each circuit alternately operative to operate said draft while said predetermined temperature range prevails, said thermostat being operative out of said temperature range to interrupt alternate operation of said draft.

8. In a heating system having means providing a temperature increasing effect, the combination of a circuit for putting said means into operation, a circuit for taking said means out of operation, a thermostat for simultaneously maintaining a switch in each circuit closed over a predetermined temperature range, a limit switch in each circuit, and means to operate alternately said limit switches to operate said first named means while said predetermined temperature range prevails, said thermostat being operative out of said temperature range to interrupt said alternate operation.

9. In a heating system having means providing a temperature increasing effect, the combination of a circuit for putting said means into operation, a circuit for taking said means out of operation, a thermostat for simultaneously maintaining a switch in each circuit closed over a predetermined temperature range, and means in each circuit operative to alternately put into operation and take out of operation said first named means while said predetermined temperature range prevails, said thermostat being operative out of said temperature range to interrupt said alternate operation.

10. In a heating system, the combination of means for providing a temperature adjusting effect, means controlling the same, means to alternately render operative and inoperative said controlling means in periods of fixed duration within a relatively small predetermined temperature range, means to maintain operative or inoperative, as required, said controlling means continuously at the conclusion of one of said alternate periods while the temperature is without said range, and manually operable means to interrupt said alternate operation and to permit automatically the resumption of said alternate operation while the temperature in said region is within said range.

11. In a heating system, the combination of means for providing a temperature increasing effect, means controlling the same, means to alternately render operative and inoperative said controlling means in periods of fixed duration within a predetermined temperature range, means to maintain operative or inoperative said controlling means continuously at the conclusion of one of said alternate periods while the temperature is without said range, and manually operable means to interrupt said alternate operation and to permit automatically the resumption of said alternate operation while the temperature is within said range, said manually operable means being also effective to render operative or inoperative said controlling means, and to permit its automatic return to normal position while the temperature is without said range.

MERVIN R. DOOLITTLE.